United States Patent [19]
Engelstatter

[11] 3,809,954
[45] May 7, 1974

[54] ELECTRONIC FLASH UNIT WITH AUTOMATIC FLASH TERMINATION OF INCREASED RELIABILITY

[75] Inventor: Heinz Engelstatter, Bad Soden, Germany

[73] Assignee: Braun Aktiengesellschaft, Frankfurt, Germany

[22] Filed: June 15, 1972

[21] Appl. No.: 262,972

[30] Foreign Application Priority Data
June 23, 1971 Germany.............................. 2131057

[52] U.S. Cl. ........................... 95/10 CE, 315/241 P
[51] Int. Cl. .......................................... G03b 15/05
[58] Field of Search..................... 95/10 CE, 11.5 R; 315/241 P

[56] References Cited
UNITED STATES PATENTS
3,646,865  3/1972  Biber ................................... 95/11.5

Primary Examiner—Samuel S. Matthews
Assistant Examiner—Michael L. Gellner
Attorney, Agent, or Firm—Michael S. Striker

[57] ABSTRACT

To a conventional electronic flash unit having a flash tube, a release contact, an exposure measuring circuit furnishing an exposure control signal and a terminating switch connected in series with the flash tube for automatic flash termination under control of the exposure measuring circuit, is added a first auxiliary switch connected in parallel with the capacitor storing the flash energy and connected to the release button for switching the terminating switch to the conductive state upon activation of the release button, and a second auxiliary switch connected to the output of the exposure measuring circuit for switching the terminating switch to the blocked state when the exposure control signal signifies a predetermined exposure.

10 Claims, 1 Drawing Figure

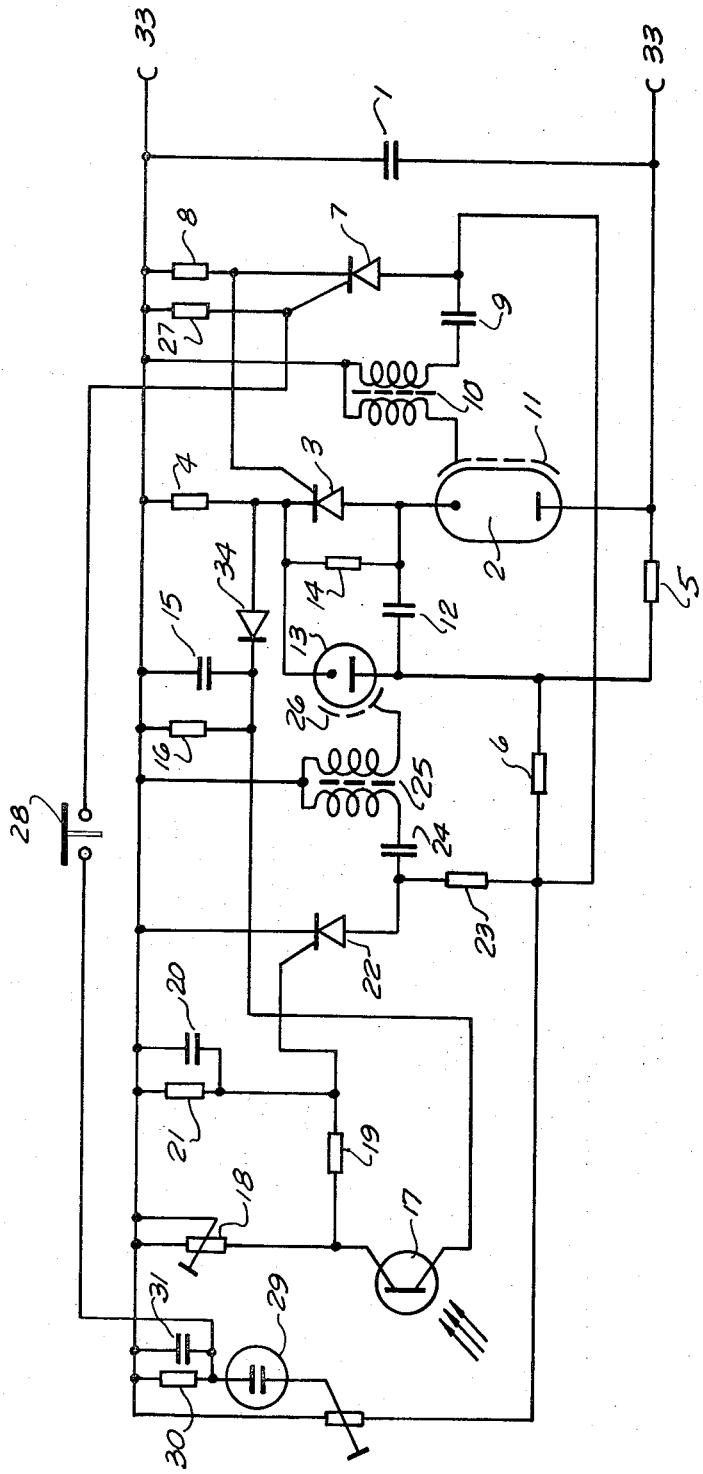

ELECTRONIC FLASH UNIT WITH AUTOMATIC FLASH TERMINATION OF INCREASED RELIABILITY

BACKGROUND OF THE INVENTION

This invention relates to an electronic flash unit having automatic exposure control circuits for terminating the flash when the correct exposure has been attained. In particular, it relates to electronic flash units having a flash tube whose flash is initiated by means of a release button and further having a flash capacitor storing the energy for the flash, an exposure control circuit having a light sensitive element, and a terminating switch connected in series with the flash tube, said switch being switched to a blocked condition terminating the flash when the exposure control signal signifies the desired exposure.

In conventional equipments of this type, initiation of the flash is accomplished by the discharge of the energy in an ignition capacitor through the primary winding of an ignition transformer upon activation of the release button. Simultaneously with the application of an ignition signal to the ignition electrode of the flash tube, a signal is applied to the terminating switch means to cause same to become conductive, thereby completing the ignition circuit.

Part of the light reflected from the object illuminated by the flash is then received by the light sensitive element. The light sensitive element then functions to generate an electrical signal which, in conventional circuits, is integrated thus signifying the total quantity of light which has fallen on the light sensitive element. When the so-integrated signal, namely the exposure control signal, has reached a predetermined magnitude the terminating switch is switched to the blocked condition thereby terminating the flash.

In conventional circuits of this type, a voltage divider is arranged in the primary circuit of the ignition transformer, for furnishing the control voltage for switching the terminating switch means to the conductive state.

A disadvantage of this arrangement has been found to be that damped oscillations set up in the primary circuit of the ignition transformer upon closure of the release contact, can cause a second unwarranted ignition of the flash tube, since the negative half wave thereof can put the terminating switch means into a renewed conductive condition. Such relighting of the flash tube of course results in excessive exposure and should therefore be avoided.

In another known arrangement, the terminating switch means must be a special type of thyristor which can be switched from a conductive to a non-conductive state by a signal at the gate. Such thyristors are, however, relatively expensive. Therefore, other circuits have been developed which allow the use of the standard type of thyristor.

However, a further difficulty arises. In the conventional circuit having a voltage divider in the primary circuit of the flash tube ignition transformer, only a relatively low voltage is available for controlling the gate of the terminating switch thyristor. This is because only a small current is available to flow through said voltage divider. Because of this low control voltage, a relatively long time is required until the terminating thyristor becomes fully conductive. Thus, initially, the resistance of this thyristor is relatively high. In order to prevent excessive heat generation in such thyristors, thyristors with a high power rating must, therefore, be used.

It is a further disadvantage of the conventional equipment, that the control signal remains at the gate of the thyristor following the termination of the flash until the flash capacitor has fully recharged. This means that difficulties occur in blocking the thyristor, especially when the flash capacitor was substantially fully discharged during the flash. The difficulty in blocking the thyristor results in a relatively long time until the equipment is again ready for operation.

Since such equipments are not immediately ready for operation after each flash, it would further be desirable to furnish some indication when the equipment is again ready for operation, to prevent improper operation of the flash unit during the flash.

SUMMARY OF THE INVENTION:

It is an object of the present invention to eliminate the above-described disadvantages and to furnish an electronic flash unit having increased reliability, while using only relatively inexpensive commercially available elements.

The present invention is comprised in an electronic flash unit which has a flash tube means for furnishing a light flash, a flash capacitor means for storing the energy for said flash and release contact means for initiating said flash upon activation. The present invention comprises the combination of terminating switch means having a blocked and conductive state connected in series with said flash tube means. It further comprises first auxiliary switch means connected in parallel with said flash capacitor and connected to said release contact means for switching said terminating switch means to said conductive state following said activation of said release contact means. The electronic flash unit further has an exposure measuring means having a light sensitive element, the exposure measuring means furnishing an exposure control signal varying as a function of light falling on said light sensitive element. Finally, second auxiliary switch means are connected to said exposure measuring means for switching said terminating switch means to said blocked state when said exposure control signal signifies a predetermined exposure, thereby terminating said flash. This results in equipment which operates reliably even when the object of be photographed is relatively close to the flash. Under these conditions, the flash is terminated very rapidly, since the exposure requirements have been filled rapidly, and the above-mentioned damped oscillations in the primary circuit of the ignition transformer may not as yet have died down. These can, as mentioned above, result in an undesired reignition of the flash tube. This, as stated above, is prevented by the use of the first auxiliary switch means.

In a preferred embodiment of the present invention the terminating switch means comprise thyristor means which block upon application of a reverse voltage. In conventional fashion, a storage capacitor is furnished for supplying this reverse voltage.

The storage capacitor discharges through the second auxiliary switch means when same are in the conductive state. If this discharge current is larger than the flash tube current, the voltage across the thyristor is reversed. The reverse voltage must be applied for a length of time sufficient to cause the blocking of the thyristor.

In a further preferred embodiment of the present invention the first auxiliary switch means comprise a thyristor. The thyristor blocks upon application of a reverse voltage thereto. Connected in parallel with the anode-cathode circuit of said thyristor is a voltage divider comprising a glow lamp connected in series with a capacitor. The common point of said glow lamp and capacitor is connected to the gate of the thyristor through the release contact. Thus when the release contact is closed the voltage across said capacitor is applied to the gate of said thyristor.

The magnitude of the voltage applied to the gate of said thyristor is sufficiently large for the thyristor to become fully conductive immediately. This in turn causes a voltage to be applied to the gate of the terminating switch means which is sufficient to cause said terminating switch means to become immediately fully conductive. Thus it is possible to use low power thyristors both for the terminating switch means and the first auxiliary switch means. This reduces the expense of the equipment considerably.

In a particularly preferred embodiment of the present invention, second voltage divider means are connected in parallel with said flash capacitor means. The second voltage divider means have a first voltage divider tap for supplying the energy to the above-described first voltage divider means, and thereby to the first auxiliary switch means which are connected in parallel with said first voltage divider means. The second voltage divider means further have a second voltage divider tap for supplying the energy required for the second auxiliary switch means and for charging the storage capacitor which applies the reverse voltage to the terminating switch means. This arrangement causes the full voltage for operating the first auxiliary switch means, as well as the voltage for operating the glow lamp which indicates that the equipment is ready for operation, to be available only when the storage capacitor is fully charged. This feature also greatly increases the reliability of the equipment in accordance with the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE shows a circuit diagram of a preferred embodiment of the present invention.

DESCRIPTION OF THE PREFERRED EMBODIMENT:

A preferred embodiment of the present invention will now be described with reference to the drawing.

In the FIGURE, the flash capacitor is indicated by reference numeral 1. Connected in parallel with flash capacitor 1 is a series circuit comprising the flash tube 2, the anode-cathode circuit of a thyristor 3 and a resistance 4. Thyristor 3 is one embodiment of terminating switch means. Further connected in parallel with flash capacitor 1 is a voltage divider, one embodiment of second voltage divider means, which comprises a resistor 5 series connected to a resistor 6 which in turn is series connected to a potentiometer. The common point of resistor 6 and said potentiometer is herein referred to as the first voltage divider tap, while the common point of resistors 5 and 6 is referred to as the second voltage divider tap. Connected to said first voltage divider tap is the series combination of the anode-cathode circuit of a thyristor 7 and a resistor 8. Thyristor 7 is herein referred to as first auxiliary switch means. The gate of thyristor 3 is connected to the common point of the cathode of thyristor 7 and resistor 8. Connected in parallel with the anode-cathode circuit of thyristor 7 and the series resistance 8 is a capacitor 9, the ignition capacitor, and the primary winding of ignition transformer 10 whose secondary winding is connected to the ignition electrode 11 of flash tube 2. A resistance 14 is connected in parallel with the anode-cathode circuit of thyristor 3. Connected in parallel with resistance 14 is the series combination of storage capacitor 12 and a switch tube 13, the latter being herein referred to as second auxiliary switching means. The common point of switch tube 13 and capacitor 12 is connected to the above-mentioned voltage divider tap. Connected in parallel with resistance 4 is a capacitor 15 and a further resistance 16 as well as the emitter-collector circuit of a phototransistor 17, which serves as a light sensitive element and has a load resistance 18 connected in its emitter circuit. The emitter of phototransistor 17 is connected to the parallel combination of a capacitor 20 and a resistance 21 through a resistance 19. Elements 19–21 constitute an integrating circuit. The output of the integrating circuit, namely the common point of resistance 19 and capacitor 20 is connected to the gate of a thyristor 22. The anode of thyristor 22 is connected to the above-mentioned first voltage divider tap via a resistance 23 and is further connected via an additional ignition capacitor 24 to the primary winding of an additional ignition transformer 25 whose secondary winding is connected to the ignition electrode 26 of switch tube 13.

The gate of thyristor 7 is connected to one side of the flash capacitor through a resistance 27 and is further connected to the release contact 28 of the flash unit.

First voltage divider means are connected to the variable arm of the above-mentioned potentiometer which forms part of the second voltage divider means. The first voltage divider means comprise a glow lamp 29 connected in series with a capacitor 31, herein referred to as second capacitor means. Connected in parallel with capacitor 31 is a resistor 30. The common point of capacitor 31 and glow lamp 29, herein referred to as a voltage divider tap, is connected to the other side of the release button 28. Thus when release button or contact 28 is closed, the top of capacitor 31 is directly connected to the gate of thyristor 7.

The above-described arrangement operates as follows:

When power is first applied to terminals 32 and 33, flash capacitor 1 is charged. When the voltage across flash capacitor 1 has reached its desired value, sufficient voltage exists at the first voltage divider terminal to cause glow lamp 29 to ignite and capacitor 31 begins to charge. Only when capacitor 31 is charged is the equipment ready for operation. Therefore it is desirable that the charge time of capacitor 31 is less than the reaction time of the operator of the electronic flash unit.

If the release button is now activated, the voltage across capacitor 31 is applied to the gate of thyristor 7 causing this thyristor become fully conductive. Because of the high current through resistor 8 a sufficient voltage to cause thyristor 3 to become fully conductive is immediately applied to the gate of said thyristor. Further, when thyristor 7 becomes conductive, capacitor 9 discharges through the primary winding of transformer 10 causing a pulse to appear across said primary winding, which in turn induces a pulse in the secondary winding, thereby causing flash tube 2 to fire. Since the ignition circuit is now fully conductive, a voltage appears across resistance 4 which serves as an operating voltage for the exposure measuring circuit, and in particular for the light sensitive element 17. Specifically, capacitor 15 is charged through diode 34 which also prevents discharge of capacitor 15 through resistor 4. The voltage across capacitor 15 then serves as the above-mentioned operating voltage for phototransistor 17.

If now a portion of the light from the object to be photographed falls onto phototransistor 17, a voltage corresponding to the total quantity of light having fallen on phototransistor 17 appears across capacitor 20. When this voltage has reached a value corresponding to the desired exposure, thyristor 22 becomes conductive causing capacitor 24 to discharge through the primary winding of the additional ignition transformer 25. This causes a pulse to be developed in the secondary winding of transformer 25 which in turn causes the ignition of the switch tube 13. Ignition of switch tube 13 causes the discharge of capacitor 12 through said switch tube and resistor 14. The circuit is so designed that the current flow through switch tube 13 exceeds the current flow through flash tube 2. The discharge of capacitor 12, if maintained for a time sufficient to cause recombination of the thyristor 3, causes said thyristor to block, thereby interrupting the igntion circuit of flash tube 2 and causing the termination of the flash.

It is seen that in accordance with the present invention, a simple but reliable flash tube unit with automatic flash termination is furnished.

While the invention has been illustrated and described as embodied in a circuit using specific types of switch means, it is not intended to be limited to the details shown, since various modifications and structural and circuit changes may be made without departing in any way from the spirit of the present invention.

Without further analysis, the foregoing will so fully reveal the gist of the present invention that others can be applying current knowledge readily adapt it for various applications without omitting features that, from the standpoint of prior art fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended.

I claim:

1. In an electronic flash unit having flashtube means for furnishing a light flash upon receipt of an ignition signal, flash capacitor means for storing the energy for said flash, and release contact means, in combination, terminating switch means connected in series with said flashtube means, said terminating switch means having a control electrode and switching from a blocked to a conductive state upon application of a start signal to said control electrode; first auxiliary switch means having a control electrode connected to said release contact means and an anode-cathode circuit coupled to said flashtube means and said control control electrode of said terminating switch means, for furnishing said ignition signal to said flashtube means and said start signal to said terminating switch means, substantially simultaneously and both only in response to activation of said release contact means; exposure measuring means having a light sensitive element, for furnishing an exposure control signal varying as a function of light falling on said light sensitive element; and second auxiliary switch means connected to said exposure measuring means for switching said terminating switch means to said blocked state when said exposure control signal signifies a predetermined exposure, thereby terminating said flash.

2. An arrangement as set forth in claim 1, wherein said terminating switch means have an anode-cathode circuit adapted to block upon application of a reverse voltage thereto; further comprising means applying said reverse voltage to said anode-cathode circuit under control of said second auxiliary switch means.

3. An arrangement as set forth in claim 2, wherein said means applying said reverse voltage comprise storage capacitor means.

4. An arrangement as set forth in claim 3, wherein said second auxiliary switch means has an ignition electrode, and an output circuit connected in series with said storage capacitor means, thereby forming a series circuit; further comprising means connecting said series circuit in parallel with said anode-cathode circuit of said terminating switch means; means charging said storage capacitor means to said reverse voltage when said second auxiliary switch means is in a blocked state; and means applying an ignition signal to said ignition electrode thereby switching said second auxiliary switch means to the conductive state when said exposure control signal signifies said predetermined exposure, whereby said reverse voltage is applied to said anode-cathode circuit of said terminating switch means.

5. An electronic flash unit as set forth in claim 4, wherein said means charging said storage capacitor means comprise voltage divider means connected in parallel with said flash capacitor means, said voltage divider means having a voltage divider tap connected to said storage capacitor means.

6. An electronic flash unit as set forth in claim 5, wherein said second auxiliary switch means comprise a switch tube.

7. An electronic flash unit as set forth in claim 1, wherein said exposure measuring means require an operating voltage; further comprising resistance means connected in series with said terminating switch means, and means interconnecting said resistance means and said exposure measuring means in such a manner that the voltage across said resistance means constitutes said operating voltage.

8. An arrangement as set forth in claim 1, wherein said terminating switch means is a first thyristor having an anode-cathode circuit connected in series with said flashtube means and having a gate; wherein said first auxiliary switch means is a second thyristor having an anode-cathode circuit and a gate; further comprising ignition circuit means and resistance means connected in series with said anode-cathode circuit of said second thyristor and connecting means connecting said resistance means to said gate of said first thyristor in such a manner that said start signal is furnished to said gate and said ignition signal is furnished to said flashtube when said second thyristor switches to said conductive state.

9. In an electronic flash unit having flashtube means for furnishing a light flash upon receipt of an ignition signal, flash capacitor means for storing the energy for said flash, and release contact means, in combination, terminating switch means connected in series with said flashtube means, said terminating switch means having a control electrode and switching from a blocked to a conductive state upon application of a start signal to said control electrode; first auxiliary switch means connected in parallel with said flash capacitor means and connected to said release contact means for furnishing said ignition signal to said flashtube means and said start signal to said terminating switch means in response to activation of said release contact means; first voltage divider means connected in parallel with said flash capacitor means, said first voltage divider means including capacitor means; threshold means responsive to the voltage across said flash capacitor means for rapidly charging said capacitor means when said voltage across said flash capacitor means is a desired voltage; means connecting said release contact means to said capacitor means and said control electrode of said first auxiliary switch means in such a manner that activation of said release contact means directly connects said control electrode to said capacitor means thereby immediately switching said first auxiliary switch means to said conductive state; exposure measuring means having a light sensitive element, for furnishing an exposure control signal varying as function of light falling on said light sensitive element; and secondary auxiliary switch means connected to said exposure measuring means for switching said terminating switch means to said blocked state when said exposure control signal signifies a predetermined exposure, thereby terminating said flash.

10. An arrangement as set forth in claim 9, wherein said threshold means is a glow lamp adapted to be ignited when said voltage across said flash capacitor means is said desired voltage, thereby indicating that said electronic flash unit is ready for operation.

* * * * *